April 15, 1930.  C. C. FARMER ET AL  1,754,228
ELECTRIC SIGNAL SYSTEM
Filed Oct. 8, 1927
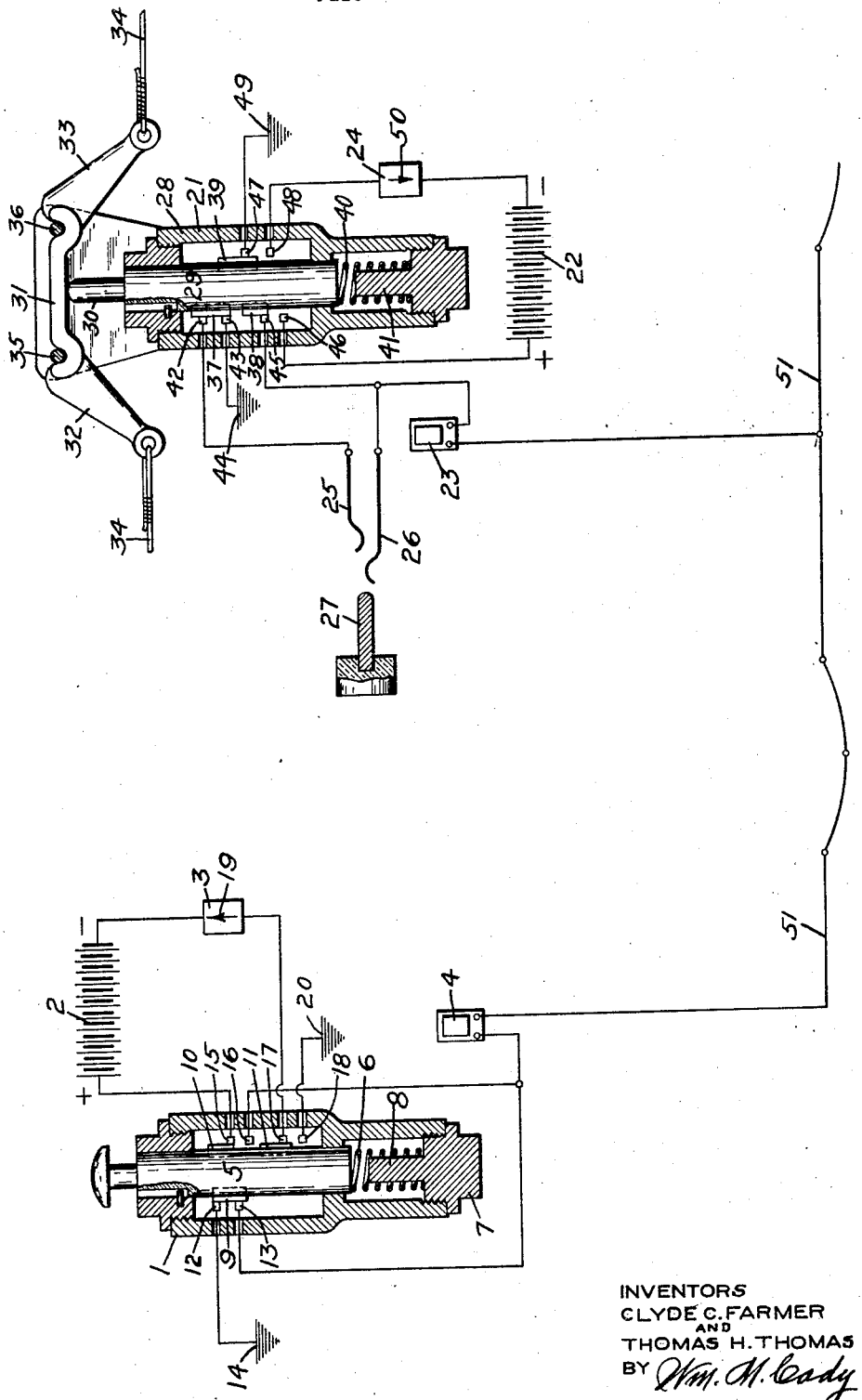
INVENTORS
CLYDE C. FARMER
AND
THOMAS H. THOMAS
BY Wm. M. Cady
ATTORNEY Patented Apr. 15, 1930

1,754,228

UNITED STATES PATENT OFFICE

CLYDE C. FARMER, OF PITTSBURGH, AND THOMAS H. THOMAS, OF EDGEWOOD, PENNSYLVANIA, ASSIGNORS TO THE WESTINGHOUSE AIR BRAKE COMPANY, OF WILMERDING, PENNSYLVANIA, A CORPORATION OF PENNSYLVANIA

ELECTRIC SIGNAL SYSTEM

Application filed October 8, 1927. Serial No. 224,866.

This invention relates to signal systems, and more particularly to an electric signal system adapted for use on railway trains.

An object of our invention is to provide a train signal system by the use of which a trainman may signal the engineman from any car of a train and by which the engineman may cause his reply signal to be transmitted to the car station from which the trainman's signal originated and further by which the engineman may, under certain conditions, signal any number of car stations at which the trainman may desire to receive the engineman's signal.

Another and more specific object of the invention is to provide an electric signal system for a railway train, by which the trainman may, through the operation of an electric switch, cause an electric current to flow from one source of current, through electrically controlled signal devices to operate them, and in which the engineman may, by the operation of an electric switch, cause an electric current from another source to flow through said devices to operate them, and further, in which the current from one source is prevented from flowing to the other in the event of both switches being operated at the same time.

In the accompanying drawing, the single figure is a diagrammatic view of a train signal system embodying our invention.

According to our invention, the locomotive or controller car of a train may be provided with an engineman's switch 1, a source of electric current 2, a rectifier 3 and a signal indicating device such as the buzzer 4.

The switch 1 may comprise a casing having a contact member 5 slidably mounted therein, which is adapted to be moved manually in one direction and in the opposite direction by a spring 6 which is interposed between the member and a plug 7 having screw-threaded connection with the casing, such plug having a stop 8 adapted to limit the movement of the contact member in one direction. The contact member is provided with contacts 9, 10 and 11 which are insulated from each other. The contact 9, when the contact member is in its normal position, as shown in the drawing, connects terminal contacts 12 and 13, the contact 12 being connected to ground at 14 and the contact 13 being connected with one terminal of the buzzer 4, the opposite terminal of the buzzer being connected with a train wire 51. The contact 10, when the contact member is depressed, is adapted to connect terminal contacts 15 and 16, the contact 15 being connected with the positive terminal of the battery 2 and the contact 16 being connected to the connection between the contact 13 and one terminal of the buzzer 4. The contact 11, when the contact member is depressed, is adapted to connect the terminal contacts 17 and 18, the contact 17 being connected to the negative terminal of the battery 2, the rectifier 3 being interposed in this connection for permitting current to flow only in the direction indicated by the arrow 19 and the contact 18 being connected to ground at 20.

Each car of the train may be provided with a trainman's switch device 21, a source of electric current such as the battery 22, a signal indicating device such as a buzzer 23, a rectifier 24 and a jack switch having spaced tines 25 and 26 adapted to be connected by the insertion of a plug 27.

The switch device 21 may comprise a casing 28, which contains a sliding contact member 29 having an operating stem 30 adapted to be operated by a lever 31 having operating arms 32 and 33, each having an operating cord 34 connected therewith. Mounted on the casing, there are fulcrum pins 35 and 36 which are so disposed that, when the arm 32 operates, the lever 31 turns about the fulcrum pin 35 and when the arm 33 is operated, the lever 31 turns about the fulcrum pin 36 and in either case the stem 30 is operated.

The contact member 29 is provided with contacts 37, 38 and 39 which are insulated from each other and is normally maintained in the position shown in the drawing, by a spring 40 mounted in the casing. This member 29, when moved a predetermined distance from its normal position, engages a stop 41 formed on a plug having screw-threaded engagement with the casing 28. The contact 37, when the member 29 is in its normal position, connects terminal contacts 42 and 43, the contact 42 being connected to the tine 25 of the jack switch and the contact 43 being connected to ground at 44. The contact 38, when the member 29 is depressed is adapted to connect terminal contacts 45 and 46, the contact 45 being connected with one terminal of the buzzer 23, the other terminal of this buzzer being connected to the train wire 51, and the contact 46 being connected to the positive terminal of the battery 22. The contact 39, when the member 29 is depressed, is adapted to connect terminal contacts 47 and 48, the contact 47 being connected to ground at 49 and the contact 48 being connected to the negative terminal of the battery 22, the rectifier 24 being interposed in this latter connection to permit the flow of current only in the direction as indicated by the arrow 50 in the drawing.

The tine 26 of the jack switch is connected to the wire connecting the contact 45 and one terminal of the buzzer 23.

Assuming the several parts of the invention to be in their normal positions as shown in the drawing, and the trainman desires to signal the engineman, the trainman pulls the cord 34 until the contact member 29 comes to rest against the stop 41, at which time the contact 37 will be out of connecting contact with the contacts 42 and 43 and the contact 38 will connect the terminal contacts 45 and 46, while the contact 39 will connect the contacts 47 and 48, and as the contact 9 of the switch device 1 is in connection with the terminal contacts 12 and 13, a circuit is completed from ground 49 through battery 22, buzzer 23, train wire 51, buzzer 4, contact 9 of the engineman's switch 1 to ground 14 through which current flows only in the direction as indicated by the arrow 50, which causes both buzzers to operate. By operating the contact member up and down, the trainman may cause any predetermined signal to be sounded at the engineman's station.

For the trainman to receive a signal, in reply to his signal, or one initiated by the engineman, he permits the contact member 29 to return to its normal position, and then inserts the plug 27 between the tines 25 and 26 of the jack switch at each of the car stations where he desires the engineman's signal to sound. The engineman may now signal the trainman by the use of his switch 1. When the engineman depresses the contact member 5, a sufficient distance that it comes to rest against the stop 8, the contact 9 will be out of connecting engagement with the terminal contacts 12 and 13, so that the battery 2 will not be connected to ground 14. In this position of the contact member 5, the contact 10 will connect the terminal contacts 15 and 16, thus connecting the positive terminal of the battery 2 to one terminal of the buzzer 4, and the contact 11 will connect the terminal contacts 17 and 18, thus connecting the negative terminal of the battery 2 to ground 20, thus completing a circuit from ground 20 through rectifier 3 only in the direction as indicated by the arrow 19, battery 2, buzzer 4, train wire 51, buzzer 23, jack switch contact 37 of the trainman's switch to ground 44, and the current flowing through this circuit will cause both buzzers to operate. By the operation of the contact member 5, any predetermined signal may be sounded at the trainman's station or stations.

If, for any reason, the contact members 5 and 29, of the engineman's and trainman's switches, respectively, should be in their depressed positions at the same time, the rectifiers 3 and 24 will prevent current from flowing from one battery to the other. If it were not for these rectifiers 3 and 24, the positive terminals of the batteries 2 and 22 would be connected together, in such a manner, when the contact members 5 and 29 are both depressed, that current from the battery having the greatest voltage would flow to the battery having a lower voltage, and which flow of current might be so great that the wires or some of the apparatus might become damaged due to heating, incident to such flow.

While one illustrative embodiment of the invention has been described in detail, it is not our intention to limit its scope to that embodiment or otherwise than by the terms of the appended claims.

Having now described our invention, what we claim as new and desire to secure by Letters Patent, is:—

1. In an electric train signal system, the combination with a train wire, of an electrically controlled signal indicating device on the head vehicle of a train and an electrically controlled signal indicating device on each of the other vehicles of the train and each connected to said train wire, a source of current on each of said vehicles, switch means on the head vehicle operative to connect the negative terminal of the local source of current to ground and the positive terminal to said train wire to permit current to flow from said local source to operate said signal devices, switch means on each of said other vehicles of the train operative to connect the negative terminal of the local source of current to ground and the positive terminal to said train wire to permit current to flow from said source to operate said signal devices, and means for preventing the current from flowing from one of said sources of current to the other when said switch devices connect the positive terminals of a plurality of said sources of current together.

2. In an electric train signal system, the combination with a train wire, of an electrically controlled signal indicating device on the head vehicle of a train and a like signal indicating device on each of the other vehicles of the train and each connected to said train wire, a source of current on each of said vehicles, switch means on the head vehicle operative to connect the negative terminal of the local source of current to ground and the positive terminal to said train wire to permit current to flow from the source through said devices, switch means on each of the other vehicles of the train operative to connect the negative terminal of the local source of current to ground and the positive terminal to said train wire to permit current to flow through said devices, and means for preventing the flow of current from one of said sources to another when the positive terminals of a plurality of said sources are connected together.

3. In an electric train signal system, the combination with a train wire, of an electrically controlled signal indicating device on the head vehicle of a train and a like signal indicating device on each of the other vehicles of the train and each connected to said train wire, a source of current on each of said vehicles, switch means on the head vehicle operative to connect the negative terminal of the local source of current to ground and the positive terminal to said train wire to permit current to flow from the local source through said devices, switch means on each of the other vehicles of the train operative to connect the negative terminal of the local source of current on at least one of said other vehicles to ground and the positive terminal to said train wire to permit current to flow through said devices, and means interposed between each of said sources of current and ground for preventing the flow of current from one of said sources to the other when said switch devices connect the positive terminals of said sources.

4. In an electric train signal system, the combination with a train wire, of an electric signal indicating device on each vehicle of the train and each connected to said train wire, a source of electric current on each of said vehicles, a switch device on each of said vehicles operative to connect the local source of current to ground and to said train wire to operate said devices, and means for preventing current from flowing from one of said sources to another when the terminals of like polarity of a plurality of said sources are connected together by the operation of a plurality of said switch devices.

5. In an electric train signal system, the combination with a train wire, of an electric signal indicating device on each vehicle of the train and each connected to said train wire, a source of electric current on each of said vehicles, a switch device on each of said vehicles operative to connect the local source of current to ground and to said train wire to operate said devices, and means for preventing current from flowing from one of said sources to another when the terminals of like polarity of a plurality of said sources are connected together in opposition to each other.

In testimony whereof we have hereunto set our hands.

CLYDE C. FARMER.
THOMAS H. THOMAS.